(No Model.)  2 Sheets—Sheet 1.

W. C. HARTMANN.
CENTRIFUGAL CREAM SEPARATOR.

No. 528,941. Patented Nov. 13, 1894.

WITNESSES
P. D. Goodwin
Hamilton D. Turner

INVENTOR
William C. Hartmann
By his Attorneys
Howson & Howson (No Model.)

W. C. HARTMANN.
CENTRIFUGAL CREAM SEPARATOR.

No. 528,941. Patented Nov. 13, 1894.

WITNESSES.
F. D. Goodwin
Hamilton D. Turner

INVENTOR
William C. Hartmann
By his Attorneys.
Howson & Howson

UNITED STATES PATENT OFFICE.

WILLIAM C. HARTMANN, OF PHILADELPHIA, PENNSYLVANIA.

CENTRIFUGAL CREAM-SEPARATOR.

SPECIFICATION forming part of Letters Patent No. 528,941, dated November 13, 1894.

Application filed December 11, 1893. Serial No. 493,387. (No model.)

*To all whom it may concern:*

Be it known that I, WILLIAM C. HARTMANN, a citizen of the United States, residing in Philadelphia, Pennsylvania, have invented certain Improvements in Centrifugal Cream-Separators, of which the following is a specification.

The object of my invention is to so construct a centrifugal machine for separating cream from milk that the volume of liquid under treatment will be divided into a great number of small bodies in each of which the separation can be much more rapidly effected than when the entire volume is treated as a single mass. This object I attain in the manner hereinafter set forth, reference being had to the accompanying drawings, in which—

Figure 1:
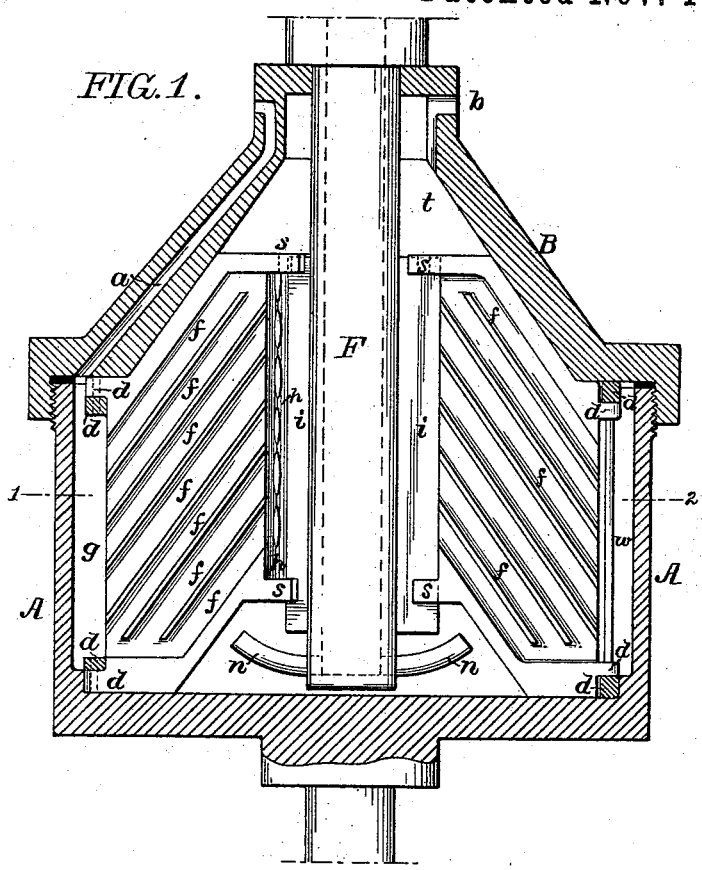
Figure 2:
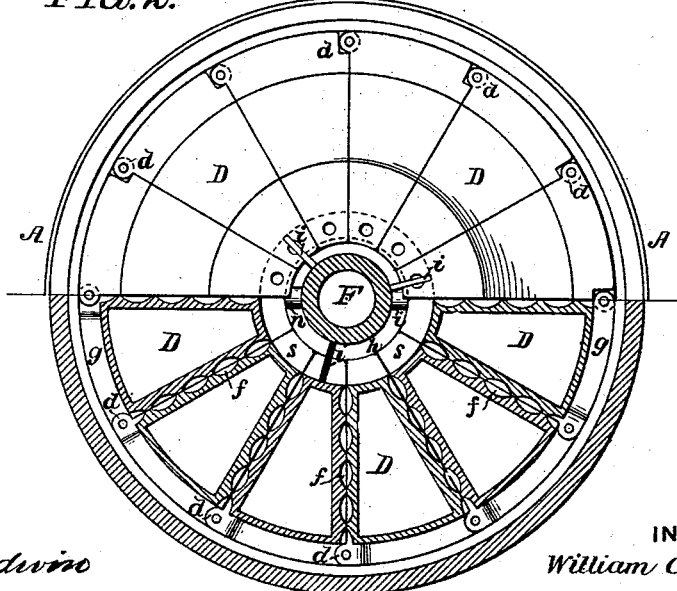
Figure 3:
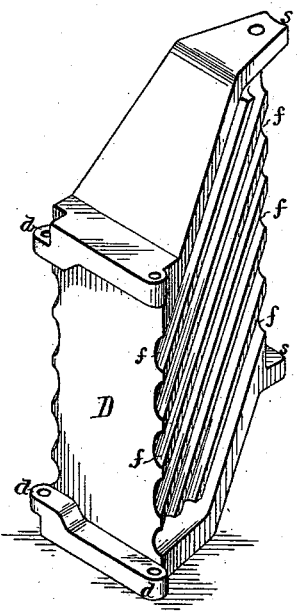
Figure 4:
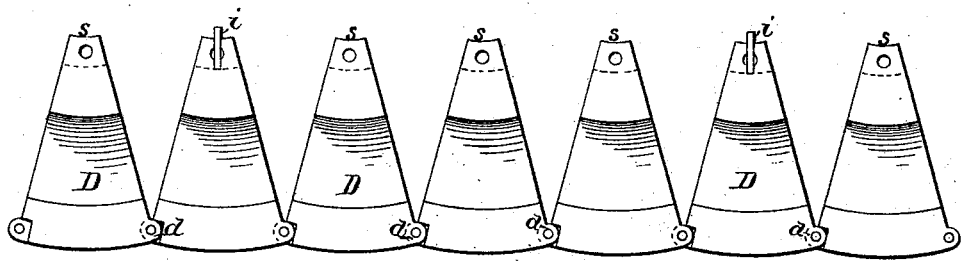

Figure 1, is a vertical section, partly in elevation, of a cream separator constructed in accordance with my invention. Fig. 2, is a view, partly in section on the line 1—2, Fig. 1, and partly in plan with the cover of the casing removed. Fig. 3, is a perspective view of one of the sections of the internal structure of the separator; and Fig. 4, is a plan view, on a reduced scale, showing said structure removed from the casing and spread apart for cleansing purposes.

In Fig. 1 A represents the cylindrical body of the separator permanently closed at the bottom and having at the top a detachable conical cap or cover B in which are formed the usual escape passages $a$ and $b$, the passage $a$ communicating with the outer portion of the cylindrical body of the separator and serving for the discharge of the skim milk, while the passage $b$ communicates with the contracted upper portion of the conical cap or cover B and provides for the escape of the cream. These parts are similar to centrifugal separators as heretofore made, and consequently form no part of my present invention. Within the separator, however, is a structure composed of a series of hollow segments D which are provided with lugs $d$ whereby they are hinged together, and in each side of each of these segments is formed a series of passages $f$ inclined downward from the inner to the outer edge of the segment, the outer ends of these passages communicating with the milk space $g$ which surrounds the segments and the inner ends of said passages communicating with the cream space $h$ formed between the inner ends of the segments and the central milk supply tube or pipe F. The upper portion of each segment is bevelled to correspond with the conical cap or cover B which thus bears upon and confines the upper portions of said segments and three or more of the segments may be provided with internally projecting blades or plates $i$ for bearing upon the tube F as shown in Fig. 2, so as to insure the rotation of the cream with the casing.

By means of the large number of small passages $f$ the milk is divided into a great number of bodies, each of limited volume, in which the separation can be effected with maximum rapidity. Hence the operation is materially facilitated as compared with the separation of the cream from a large volume of milk acted upon as one mass.

The under side of each of the segments D is beveled internally so as to form a chamber $m$ in which the milk is first received and the feed pipe F has projecting tubes $n$ preferably curved upwardly at the outer ends so as to discharge milk in the first instance into the outer portion of this chamber from which it finds its way to the chamber $h$ and thence to the passages $f$ of the segments. Each segment has at top and bottom a flange $s$ partially inclosing the cream space $h$ at top and bottom. Hence the milk is compelled to pass close to the tube F in order to enter the cream space so as to insure the maximum centrifugal action, the cream rising through perforations in the upper flanges, so as to enter the discharge chamber $t$ above the segments D.

By hinging the segments together at their outer edges as described the withdrawal of a single hinge pin permits of the opening out of the segments as shown in Fig. 4, so that ready access to all parts of each segment is permitted for cleansing purposes and the machine can thus be kept sweet and clean at all times.

This construction of separate segments, hinged together, however, while preferable, is not absolutely essential to the main features of my invention.

Having thus described my invention, I claim and desire to secure by Letters Patent—

1. The combination of the casing of a centrifugal separator with an internal structure comprising a series of segments having in their meeting faces recesses forming downwardly inclined passages providing a communication between the central cream space and the outer skim milk space of the separator, substantially as specified.

2. The combination of the casing of a centrifugal separator, with an internal structure consisting of a series of segments hinged together at their outer edges and having in their meeting faces recesses forming downwardly inclined passages extending from the central cream space to the outer skim milk space of the separator, substantially as specified.

3. The combination of the casing of a centrifugal separator, with an internal segmental structure having downwardly inclined passages communicating with the central cream space and outer skim milk space of the separator, each segment having at its upper end an internally projecting perforated flange, substantially as specified.

4. The combination of the casing of a centrifugal separator, having a central feed pipe, with a series of segments forming an internal structure with downwardly inclined passages in each segment communicating with the central cream space and outer skim milk space of the separator, and internally projecting blades for bearing upon the central feed tube carried by one or more of the segments, substantially as specified.

In testimony whereof I have signed my name to this specification in the presence of two subscribing witnesses.

WM. C. HARTMANN.

Witnesses:
FRANK E. BECHTOLD,
H. F. REARDON.